United States Patent [19]

Hinn et al.

[11] 4,438,451
[45] Mar. 20, 1984

[54] DUAL-STANDARD SECAM/PAL COLOR TV RECEIVER WITH AUTOMATIC CONTROL OF OPERATING MODE

[75] Inventors: Werner Hinn, Zollikerberg, Switzerland; Mark B. Knight, Somerville, N.J.

[73] Assignee: RCA Corporation, New York, N.Y.

[21] Appl. No.: 352,211

[22] Filed: Feb. 25, 1982

[30] Foreign Application Priority Data

Apr. 29, 1981 [GB] United Kingdom ............... 8113294

[51] Int. Cl.³ .................. H04N 9/50; H04N 9/42
[52] U.S. Cl. .................................. 358/11; 358/19; 358/25
[58] Field of Search ............... 358/11, 14, 18, 19, 358/23, 24, 25

[56] References Cited

U.S. PATENT DOCUMENTS

| | | | |
|---|---|---|---|
| 4,233,622 | 11/1980 | Groeneweg | 358/11 |
| 4,240,102 | 12/1980 | Groeneweg | 358/11 |
| 4,263,608 | 4/1981 | Hinn | 358/11 |
| 4,357,623 | 11/1982 | Hinn | 358/18 |

Primary Examiner—Tommy P. Chin
Attorney, Agent, or Firm—Eugene M. Whitacre; Paul J. Rasmussen; William H. Meagher

[57] ABSTRACT

Dual-standard (PAL/SECAM) color TV receiver includes circuitry for automatically controlling the receiver's operating mode in accordance with recognition of the SECAM or PAL format of the received signals. A first sample-and-hold circuit monitors the output of an FM detector responsive to the received signals during blanking "backporch" portions of alternate line intervals, while a second sample-and-hold circuit monitors the output of said FM detector during blanking "backporch" portions of the intervening line intervals. Comparison of the outputs of the two sample-and-hold circuits achieves the desired format recognition. To avoid false recognition, sampling interval beginning is delayed relative to beginning of SECAM lead-in oscillations or PAL swinging bursts, while sampling interval termination substantially coincides with end of blanking interval.

8 Claims, 3 Drawing Figures

DUAL-STANDARD SECAM/PAL COLOR TV RECEIVER WITH AUTOMATIC CONTROL OF OPERATING MODE

The present invention relates generally to operating mode control apparatus for a dual-standard SECAM-PAL color TV receiver, and particularly to novel apparatus for reliably effecting automatic control of the operating mode of such a receiver in response to parameters of the received signals.

In the SECAM color television system, R-Y and B-Y color-difference signals frequency modulate respective subcarriers (with respective resting frequencies of 4.40625 MHz. and 4.250 MHz.) which are provided alternately on a line-by-line basis in the active line intervals of the transmitted SECAM signal. An economical approach to processing such signals in a SECAM receiver, which is also attractive for use in dual-standard (SECAM/PAL) receivers, is to convert the SECAM signal into a signal similar to a PAL signal (i.e., a "quasi-PAL" signal) for further processing by standard PAL signal decoding techniques. The system for effecting such conversion is desirably of the general type described in U.K. Pat. No. 1,358,551, wherein the respective SECAM subcarriers are demodulated sequentially by a single FM detector, and the resultant color-difference signals amplitude modulate in appropriate sequence respective phases of a subcarrier derived from the PAL crystal oscillator of the PAL decoder apparatus. U.S. Pat. No. 4,232,268, for example, discloses an arrangement for line-by-line switching of the center frequency tuning of an FM detector which readily permits the aforementioned sequential demodulation of the respective SECAM subcarriers by a single FM detector.

In such use of a single FM detector for sequential demodulation of the respective SECAM subcarriers, an identification system is required for identification and correction of an incorrect mode of line-by-line switching of the detector's center frequency tuning. One source of information for such identification purposes is found in the lead-in bursts of oscillations which precede the image portion of each active line interval (with a lead-in burst at the R-Y resting frequency preceding the image portion of an active line interval that conveys R-Y image information, and with a lead-in burst at the B-Y resting frequency preceding the image portion of an active line interval that conveys B-Y image information).

In the identification system disclosed in U.S. Pat. No. 4,240,102-Groeneweg, a flip-flop develops half line rate control waves for use in switching the center frequency tuning of the detector employed for demodulating received SECAM signals. When the phasing of the flip-flop output is correct, the detector is provided with center frequency tuning (4.40625 MHz.) appropriate to demodulation of the R-Y modulated subcarrier during the image portion of an R-Y line interval of the SECAM signal, and tuning (4.250 MHz.) appropriate for demodulation of the B-Y modulated subcarrier during the image portion of a B-Y line interval of the SECAM signal. Through the supplemental association of line rate pulses in the tuning control, however, the timing of the changes in detector center frequency tuning is so controlled that during the lead-in bursts preceding the image portions of both of such R-Y and B-Y line intervals, the detector center frequency tuning is always the same (e.g., tuned for a center frequency corresponding to the R-Y subcarrier resting frequency).

In the identification system of the aforesaid Groeneweg patent, the output of a detector subject to center frequency tuning control of the above-described type is applied to a pair of sample-and -hold circuits. Using respective half line rate control waves of mutually opposite phase derived from the flip-flop, and common, line rate, burst interval gating pulses, for control of the sampling times of the respective sample-and-hold circuits, one sample-and-hold circuit effects sampling of the filtered detector output during the lead-in burst occurrence of alternate line intervals, while the other sample-and-hold circuit effects a sampling of the filtered detector output during the lead-in burst occurrence of the intervening line intervals. Comparison of the outputs of the two sample-and-hold circuits in a voltage comparator yields an output indicative of the correctness or incorrectness of the phasing of the flip-flop circuit. When the output is indicative of incorrect flip-flop phasing, the flip-flop is shut down, and then allowed to restart, whereupon a new comparison is effected, with such a process repeated until correct flip-flop phasing is achieved.

As disclosed in the aforesaid Groeneweg patent for instances of use of the above-described identification system in a dual-standard SECAM/PAL color TV receiver, information suitable for automatically controlling the operating mode of the dual-standard receiver can also be derived by comparison of the outputs of the respective sample-and-hold circuits. When SECAM signals are being received under conditions of correct phasing for the flip-flop, there will be a significant difference of a predetermined sense between the outputs of the respective sample-and-hold circuits. In the arrangement of the aforesaid Groeneweg patent, the receiver is switched into a SECAM operating mode (with the quasi-PAL output of the SECAM-PAL transcoder fed to the receiver's PAL decoder apparatus) only when such a relationship between the sample-and-hold circuit outputs is obtained. In all other instances (i.e., when the outputs are substantially equal, or when a difference of the opposite sense is obtained), the receiver is maintained in a PAL operating mode (with the PAL decoder receiving its input from a signal path bypassing the SECAM-PAL transcoder).

Since the frequency of the PAL burst remains the same in successive line intervals, one would expect the outputs of two sample-and-hold circuits to be the same during reception of a PAL signal, whereby false switching to a SECAM operating mode could not occur during such signal reception. The present invention is based, however, on a recognition that certain transient conditions can exist in the operation of the FM detector during PAL signal reception that may lead to false switching to a SECAM operating mode in the above-described mode control arrangement, unless a proper choice is made of the sampling interval location within the "backporch" region of the horizontal blanking period.

During PAL signal reception, the trailing edge of each horizontal sync pulse initiates a ringing of the "cloche" bandpass filter that precedes the limiter and FM detector. While the ringing amplitude is small, the high gain of the limiter elevates the ringing component input to the FM detector to a significant level. When the succeeding PAL burst signal arrives, the input to the FM detector undergoes a phase jump of a nature dependent upon the phase relationship between the burst signal and the sync induced oscillation upon which it is superimposed. Unfortunately, the PAL burst, while the same in frequency in successive line intervals, is phase shifted by 90° from line to line. As a consequence, during an initial settling period (e.g., about one microsecond) following the burst beginning, the FM detector output exhibits a transient of one nature during odd line intervals and of a different nature during even line intervals, with the amplitude, direction and shape of the transient dependent upon the aforementioned phase relationship. Because of the noted difference in such transients, it becomes important to minimize sampling of such transients by the sample-and-hold circuits (at least during the periods in which they exhibit significant differences), if false switching to a SECAM operating mode is to be precluded.

Pursuant to the principles of the present invention, the initiation of the sampling intervals for the sample-and-hold circuits of the above-described arrangement is desirably delayed relative to the beginning of burst appearance so that the periods of significant transient difference are excluded from the sampling intervals. In order that the initiation delay does not shorten the sampling interval to a degree compromising reliability of level detection for SECAM identification purposes, it is further recognized as desirable that the sampling interval should extend for the remainder of the period occupied by lead-in oscillations during SECAM signal reception, wherefore the termination of the sampling interval is desirably in substantial coincidence with the end of the horizontal blanking interval.

In a desirable form of implementation of a SECAM-PAL transcoder incorporating an identification system pursuant to the principles of the present invention, major elements of the transcoder are realized in integrated circuit (IC) form on a common substrate. In such IC realization, a useful input to a terminal of the IC chip is a "sandcastle" pulse train. A conventional "sandcastle" pulse form, provided by many currently available horizontal processor IC's (e.g., Philips TDA 2593), is a two level pulse in which a burst gating pulse is superimposed upon a horizontal blanking pulse. Typical timing for the burst gating pulse locates it in the "backporch" region of the horizontal blanking pulse (i.e., subsequent to the horizontal sync interval), with the leading edge occurring slightly before the beginning of the interval occupied by standard PAL bursts (and the similarly timed beginning of the interval occupied by SECAM lead-in oscillations), and with the trailing edge occurring subsequent to the end of the PAL burst interval but prior to the end of the horizontal blanking interval (and thus prior to the end of the SECAM lead-in interval).

In accordance with an illustrative embodiment of the present invention, the development of a suitable line rate sampling control pulse for the above-described identification and mode control system is achieved by circuitry responding to the respective components of a sandcastle pulse of the aforementioned type. After separation of the horizontal blanking and burst gating components of the sandcastle pulse by conventional amplitude-sensitive sandcastle decoding techniques, circuitry responsive to the separated components develops a pulse having a leading edge coinciding with the leading edge of the burst gating component and a trailing edge coinciding with the trailing edge of the horizontal blanking component. The developed pulse is supplied to delay means which slows the rise of the leading edge. A threshold device responsive to the output of the delay means provides as its output the desired sampling control pulse, with its leading edge delayed (e.g., for about one microsecond) relative to the beginning of a burst interval, and with its trailing edge substantially coinciding with the end of the horizontal blanking interval. Use of such sampling control pulses in conjunction with respective flip-flop output waves to control the respective sample-and-hold circuits in an identification system of the previously described type, enables provision of an operating mode control free of the aforementioned false switching problem during PAL signal reception. The identification system additionally functions reliably to establish correct flip-flop phasing conditions during SECAM signal reception.

Figure 1:
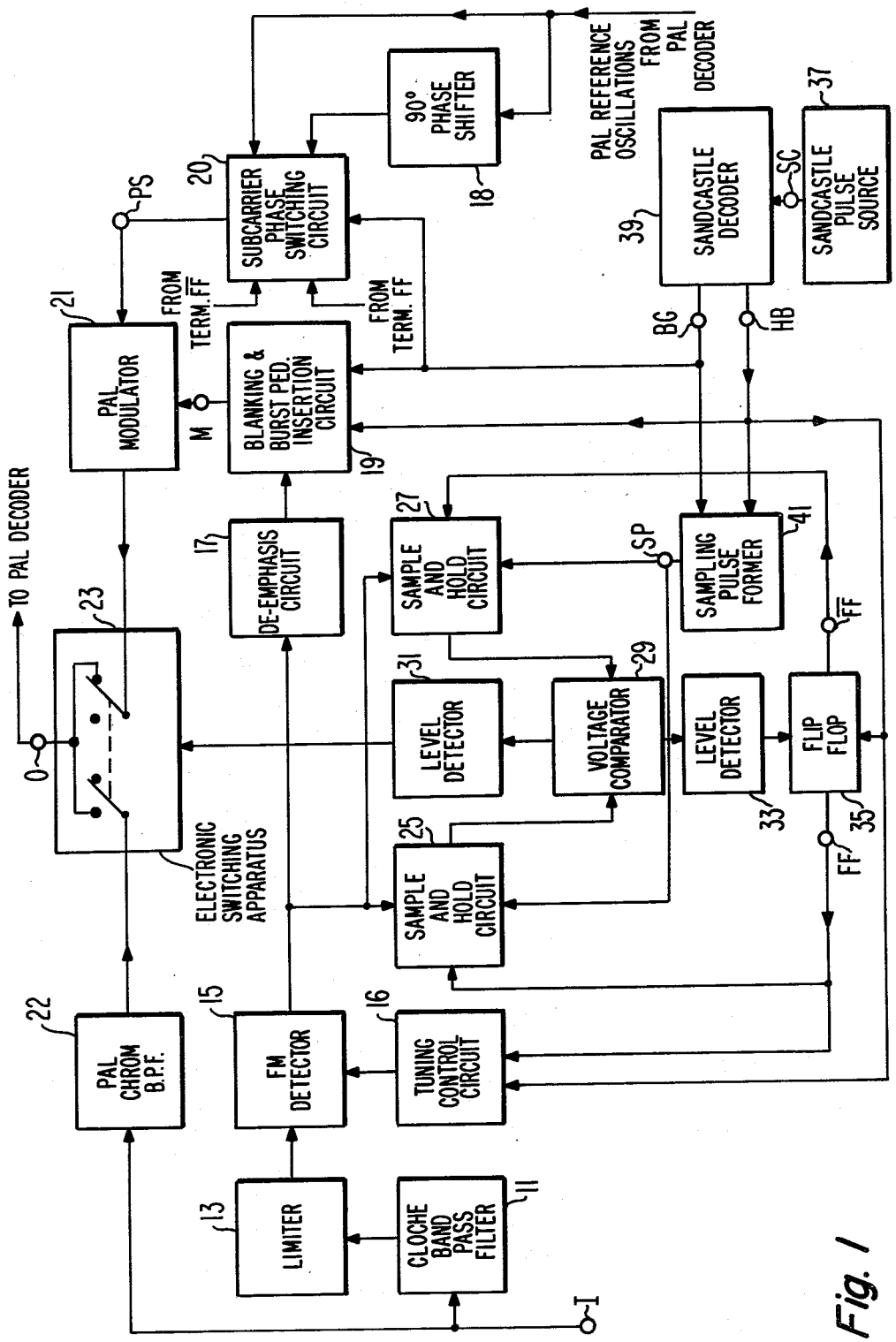
FIG. 1 illustrates, by block diagram representation, a portion of a dual-standard SECAM/PAL color television receiver incorporating structure for automatically controlling its operating mode in accordance with an illustrative embodiment of the present invention.

In the receiver apparatus of FIG. 1, a composite video input signal (derived from the dual-standard receiver's video detector, not illustrated) appears at input terminal 1, and is supplied to a pair of bandpass filters 11 and 22, as well as to the receiver's luminance channel (not illustrated). Bandpass filter 22 has a passband which encompasses the chrominance signal band of a PAL transmission. Bandpass filter 11 has a passband which encompasses the chrominance signal band of a SECAM transmission, and is provided with a frequency response characteristic of a "cloche" or bell-shaped form, appropriately complementary to the characteristic employed for pre-emphasis of subcarrier sidebands in SECAM signal formation.

The output of bandpass filter 11 is supplied to a limiter 13 which delivers a limited version thereof to an FM detector 15, illustratively of the quadrature detector type, such as described, for example, in the aforementioned U.S. Pat. No. 4,232,268. A tuning control circuit 16 is associated with the FM detector 15 so as to alter the effective center frequency of its frequency discrimination characteristic in a controlled manner to be described in detail subsequently. The tuning control, when operating correctly during reception of SECAM signals, enables the detector 15 to recover R-Y and B-Y color-difference signals in sequence, during the image portions of successive active line intervals. The color-difference signals are delivered to a de-emphasis network 17, provided with a characteristic complementary to the modulating signal pre-emphasis characteristic employed in SECAM signal formation.

The output of the de-emphasis circuit 17 is supplied to a blanking and burst pedestal insertion circuit 19, illustratively of the form disclosed in U.S. Pat. No. 4,263,608, which serves to blank the detector output during the blanking portion of each line interval, and to augment the color-difference signals with burst gating pedestals inserted during the "backporch" of horizontal blanking intervals with a timing appropriate to generation of PAL burst signals. The blanking and pedestal insertion operations are carried out in response to horizontal blanking pulse and burst gating pulse inputs derived, respectively, from output terminals HB and BG of a sandcastle decoder 39, which develops such pulses via conventional amplitude-sensitive sandcastle decoding techniques from the blanking and gating components of a two-level sandcastle pulse supplied by a sandcastle pulse source 37. Illustratively, the sandcastle pulse source comprises a portion of a horizontal processor IC, such as the aforementioned TDA 2593, incorporated in the deflection control circuits (not illustrated) of the receiver.

The augmented color-difference signal output of circuit 19 is supplied as a modulating signal to a modulating signal input terminal M of a PAL modulator 21, which modulates the amplitude of subcarrier waves of PAL subcarrier frequency in accordance with the modulating signal. The subcarrier wave input terminal PS of modulator 21 receives subcarrier frequency waves in a particular phase sequence appropriate to the formation of a quasi-PAL signal by modulator 21.

The desired phase sequencing of the subcarrier wave input to modulator is carried out by a subcarrier phase switching circuit 20, which receives PAL reference oscillations from the receiver's PAL decoder apparatus (not shown) both directly and via a 90° phase shifter 18, and which receives line rate control pulses from the aforementioned burst gating pulse terminal BG and half line rate control waves from a flip-flop circuit 35. The flip-flop circuit 35, which is subject to triggering by pulses from the aforementioned horizontal blanking pulse terminal HB, is controlled in its phasing by an identification system embodying the invention and to be subsequently described.

The operation of the subcarrier phase switching circuit 20, illustratively of the from disclosed in U.S. Pat. No. 4,233,622, is carried out in such a way during SECAM signal reception that the following results are obtained:

(A) During the image portion of a line interval when a B-Y color-difference signal is supplied to terminal M, the PAL subcarrier waves delivered to terminal PS are of a first phase;

(B) During the image portion of a line interval when R-Y color-difference signals are supplied to terminal M, the subcarrier waves delivered to terminal PS are of a second phase, shifted from the first phase by 90°;

(C) During delivery of the burst gating pedestal immediately preceding R-Y color-difference signal delivery to terminal M, the subcarrier waves delivered to terminal PS are of the aforementioned second phase;

(D) During delivery of the burst gating pedestal immediately preceding B-Y color-difference signal delivery to terminal M, the subcarrier waves delivered to terminal PS are of a third phase, differing from the second phase by 180°.

Electronic switching apparatus 23 (illustratively of the form disclosed in European Patent Application No. 80300022.3, published under No. 0013597) performs a double-pole, double-throw switching action with respect to a pair of inputs, one comprising the quasi-PAL transcoder output signal developed by the aforementioned PAL modulator 21, and the other comprising the output of the previously mentioned PAL chrominance bandpass filter 22.

In the switching state of apparatus 23 illustrated in FIG. 1, the output of modulator 21 is selectively coupled to the output terminal O for delivery therefrom to the signal input of the receiver's PAL decoder apparatus. This switching state thus establishes the SECAM operating mode of the dual-standard receiver, wherein SECAM signals are transcoded into a quasi-PAL format for delivery to the PAL decoder. In the other switching state of apparatus 23, the PAL operating mode is established, with the signal input of the PAL decoder receiving the output of PAL bandpass filter 22 which bypasses the SECAM-PAL transcoder.

Desirably, switching apparatus 23 may also include an additional switching section (not illustrated), serving to effect a disabling of the coupling of a phase control signal to the reference oscillator of the PAL decoder when thre receiver is operating in the SECAM mode, while enabling such coupling when the receiver is operating in the PAL mode (as described in the aforementioned U.S. Pat. No. 4,233,622). The switching apparatus 23 is automatically controlled, in accordance with parameters of the received signals, by an output of the identification system now to be described.

The identification system of the receiver apparatus of FIG. 1 includes a pair of sample-and-hold circuits 25 and 27, coupled to receive an output of FM detector. Illustratively, each of the sample-and-hold circuits 25, 27 may be of the general form disclosed in U.S. Pat. No. 4,240,102, for example. Desirably, for enhancement of the levels of the outputs of the sample-and-hold circuits, the detector output signal to be sampled is derived from a wideband load for detector 15, with the conventional low pass filtering of the detector output for color-difference signal recovery and subcarrier rejection purposes carried out subsequent to the takeoff of the inputs for the sample-and-hold circuits 25,27. Thus, it should be assumed that such low pass filtering action is associated with de-emphasis circuit 17 in the FIG. 1 arrangement, while a substantially unfiltered output of the detector 15 is supplied to the sample-and-hold circuits 25,27.

For sampling control purposes, the sample-and-hold circuit 25 is rendered responsive to line rate control pulses appearing at the output terminal SP of sampling pulse former 41, and to half line rate waves (illustratively of square wave form) developed at terminal FF of flip-flop 35, while the sample-and-hold circuit 27 is rendered responsive to the line rate control pulses at terminal SP, and to the half line rate waves appearing at terminal FF of flip-flop 35 (the latter waves being opposite in phase to the output at terminal FF).

Illustratively, as in the arrangement of the aforesaid U.S. Pat. No. 4,240,102, sampling of the detector output in each sample-and-hold circuit takes place only during coincidence of a line rate control pulse appearance with the appearance of a positive half-cycle of the half line rate wave applied thereto. As a consequence, sample-and-hold circuit 25 effects sampling of the detector output during alternate control pulse apearances, while sample-and-hold circuit 27 effects sampling of the detector output during the intervening control pulse appearances.

The line rate control pulses at terminal SP are developed by sampling pulse former 41 in response to inputs comprising a horizontal blanking pulse train from terminal HB of the sandcastle decoder 39, and a burst gating pulse train from terminal BG of the sandcastle decoder 39. To appreciate the relative timing of these inputs in relation to the horizontal blanking intervals of the received signals and the subcarrier reference contents thereof, reference may now be made to FIG. 2.

Figure 2:
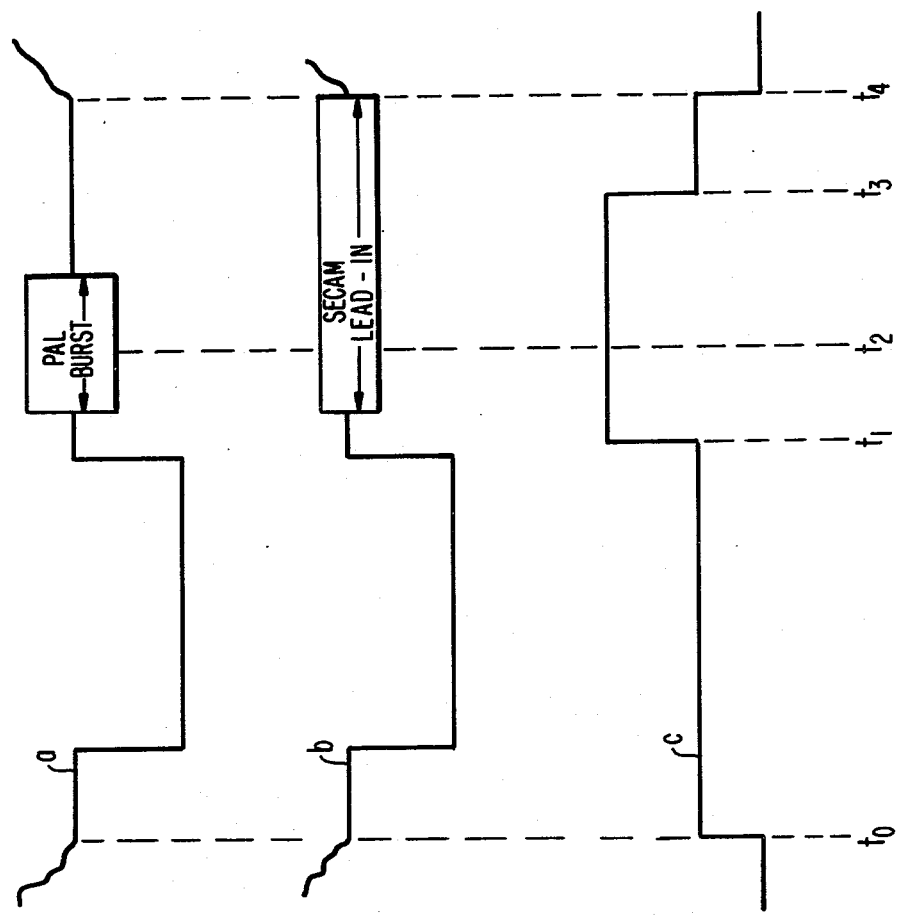
FIG. 2 illustrates graphically waveforms of aid in explanation of the operation of the FIG. 1 system.

In FIG. 2, waveform "a" illustrates the blanking interval portion ($t_0$–$t_4$) of an active line interval of a PAL signal, waveform "b" illustrates the blanking interval portion $t_0$-$t_4$) of an active line interval of a SECAM signal, and waveform "c" illustrates the sandcastle pulse output of sandcastle pulse source 37. As depicted in waveform "a", the PAL burst interval occurs in the "backporch" region, and commences shortly after the trailing edge of the horizontal sync pulse but terminates well before the end ($t_4$) of the blanking interval. In contrast, as depicted in waveform "b", the SECAM lead-in interval, while commencing with a timing similar to that of the PAL burst, extends to the end ($t_4$) of the blanking interval. As depicted by waveform "c", the sandcastle pulse typically includes a burst gating pulse component which commences at a time ($t_1$) intervening between the sync pulse trailing edge and the burst/lead-in interval initiation, and which concludes at a time ($t_3$) subsequent to the end of the PAL burst interval but prior to the end of the SECAM lead-in interval. In operation of the sandcastle decoder 39, a train of burst gating pulses (with leading edge timing coincident with $t_1$, and trailing edge timing coincident with $t_3$) is derived from waveform "c" for delivery to terminal BG, and a train of horizontal blanking pulses (with leading edge timing coincident with $t_0$, and trailing edge timing coincident with $t_4$) is derived from waveform "c" for delivery to terminal HB.

While use of the burst gating pulses appearing at terminal BG as the line rate control pulse inputs to the sample-and-hold circuits 25,27 would establish sampling intervals that encompass the PAL burst interval, as well as a substantial portion of the SECAM lead-in interval, such use is avoided herein. Instead, sampling pulse former 41 is employed to develop line rate control pulse inputs to the sample-and-hold circuits 25,27 which occupy a different portion of the "backporch" region. In particular, sampling pulse former 41 responds to the inputs from terminals BG and HB by forming sampling control pulses at terminal SP which have leading edge timing coincident with time $t_2$ (i.e., delayed relative to burst/lead-in initiation) and trailing edge timing substantially coincident with the blanking interval end ($t_4$).

Figure 3:
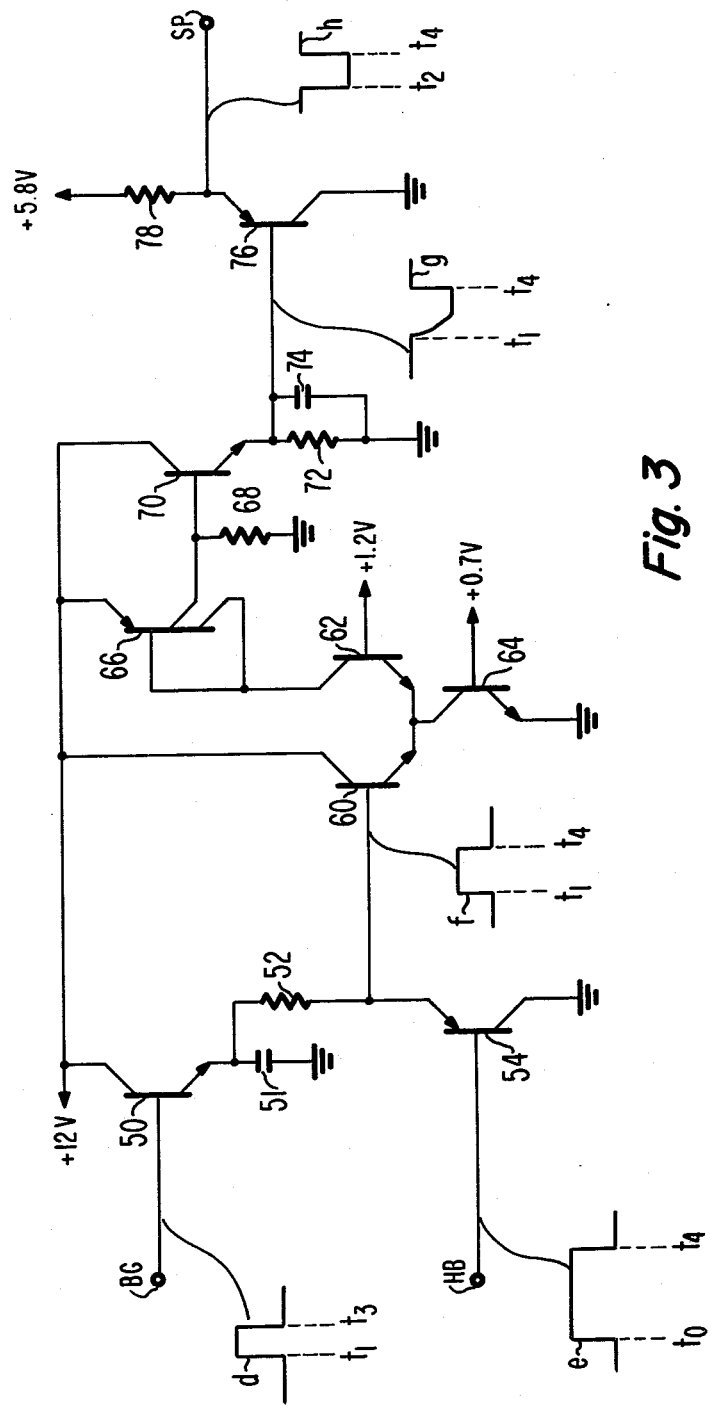
FIG. 3 illustrates schematically sampling control pulse forming circuits which may be advantageously employed in implementing the FIG. 1 system.

Circuitry which may conveniently be employed to implement the function of the sampling pulse former is illustrated schematically in FIG. 3. As therein shown, an NPN transistor 50 is disposed with its collector electrode directly connected to a supply terminal at which +12 volts appears, with its base electrode connected to the burst gating pulse output terminal BG, and with its emitter electrode connected to a point of reference (e.g., ground) potential via a capacitor 51. A PNP transistor 54 is disposed with its collector electrode directly connected to ground, with its base electrode connected to the horizontal blanking pulse output terminal HB, and with its emitter electrode connected via resistor 52 to the emitter electrode of transistor 50.

A pair of NPN transistors 60,62 are disposed in a differential amplifier configuration with their emitter electrodes jointly connected to the collector of an NPN transistor 64 disposed as a current source for the amplifier, with its emitter electrode connected directly to ground and its base electrode connected to a bias supply terminal (+0.7 V.). Signal input to the amplifier is conveyed via a direct connection between the base electrode of transistor 60 and the emitter electrode of transistor 54. The base electrode of transistor 62 is connected to a second bias supply terminal (+1.2 V.), while the collector electrode of transistor 60 is directly connected to the +12 V. supply terminal.

The collector current of transistor 62 is supplied to a current mirror circuit employing a multiple-collector PNP transistor 66. The base electrode and one of the two collector electrodes of transistor 66 are directly connected to the collector electrode of transistor 62. The emitter electrode of transistor 66 is directly connected to the +12 V. supply terminal, while the remaining collector electrode of transistor 66 is connected via a resistor 68 to ground.

An NPN transistor 70 is disposed in an emitter-follower configuration, with its base electrode directly connected to the second-named collector electrode of transistor 66, with its collector electrode directly connected to the +12 V. supply terminal, and with its emitter electrode connected to ground via a parallel RC combination, formed by resistor 72 in shunt with a capacitor 74. An output emitter-follower employs a PNP transistor 76 with its base electrode directly connected to the emitter electrode of transistor 70, with its collector electrode directly connected to ground, and with its emitter electrode connected via resistor 78 to a supply terminal at which +5.8 volts appears. The output terminal SP of the pulse former is directly connected to the emitter electrode of transistor 76.

In operation of the FIG. 3 arrangement, capacitor 51 is subject to periodic charging and discharging under the control of the trains of positive-going input pulses. Capacitor 51 rapidly charges to a positive potential offset from the positive peak of the input burst gating pulse (waveform "d") via the base-emitter path of transistor 50, upon the appearance of the leading edge thereof (at time $t_1$). At the time of this charging action, transistor 54 is in a non-conductive state, having been held off since time $t_0$ by the input horizontal blanking pulse (waveform "e"). Capacitor 51 remains charged beyond the appearance of the burst gating pulse traling edge (time $t_3$), but rapidly discharges via transistor 54 at time $t_4$ when the trailing edge of the horizontal blanking pulse renders transistor 54 conducting. The described charging and discharging actions results in delivery to the differential amplifier 60,62 of a positive-going pulse (waveform "f") having a leading edge at time $t_1$ (coinciding with the leading edge of the burst gating pulse) and a trailing edge at time $t_4$ (coinciding with the trailing edge of the horizontal blanking pulse). Differential amplifier 60,62 responds to this pulse by cutting off transistor 62 during the $t_1$-$t_4$ interval. With a mirrored version of the collector current of transistor 62 supplying base drive to emitter-follower 70, transistor 70 is also cut off during the $t_1$-$t_4$ interval.

Capacitor 74, which is charged via emitter-follower 70 to a positive potential offset from the +12 V. supply potential during the intervals between the appearances of the waveform "f" pulses, commences to discharge through resistor 72 at time $t_1$ when transistor 70 is rendered non-conducting. The discharge continues at a rate determined by the time constant of the elements 72,74. After a delay period ($t_1$-$t_2$) controlled by the time constant choice, the potential (waveform "g") at the base of transistor 76 (serving as a threshold device) drops sufficiently below the +5.8 volt supply potential to allow transistor 76 to commence conduction. Transistor 76 remains conducting (holding the terminal SP near ground potential) until time $t_4$ when transistors 62 and 70 are rendered conducting and capacitor 74 is rapidly recharged to a potential effecting cutoff of transistor 76. The sampling control pulses thus formed at terminal SP (waveform "h") comprise negative going pulses with leading edge timing coinciding with time $t_2$ and trailing edge timing coinciding with time $t_4$. Illustratively, the $t_1$-$t_2$ delay is of such length that the sampling control pulse leading edge is delayed about one microsecond relative to the PAL burst interval initiation.

Before further consideration of the operation of the identification system, it is appropriate to consider the operation of the tuning control circuit 16. For the single FM detector 15 to sequentially recover R-Y and B-Y color-difference signals, it is desired that its center frequency tuning be appropriate for demodulation of the R-Y SECAM subcarrier (4.40625 MHz.) during the image portion of an R-Y line interval, and appropriate for demodulation of the B-Y SECAM subcarrier (4.250 MHz.) during the image portion of a B-Y line interval of the SECAM signal. Accordingly, tuning control circuit 16 effects a line-to-line switching of the center frequency tuning in response to half line rate control waves from the flip-flop terminal FF. If the flip-flop phasing is correct, this will result in tuning appropriate for R-Y subcarrier demodulation during image portions of R-Y line intervals, and tuning appropriate for B-Y subcarrier demodulation during image portions of B-Y line intervals; however, if the flip-flop phasing is incorrect, the result will be inappropriate center frequency tuning for all line interval image portions.

To aid in identification of such incorrect phasing when it occurs, horizontal blanking pulses from terminal HB are utilized in combination with the half line rate control waves from terminal FF to effect a composite control of the center frequency tuning, whereby the timing of the changes in center frequency tuning is such that, during the horizontal blanking portions of both R-Y and B-Y line intervals, the center frequency tuning is the same (e.g., tuned for a center frequency corresponding to the R-Y subcarrier resting frequency).

Under such conditions of operation for the tuning control circuit 16, the outputs of the respective sample-and-hold circuits 25,27 will necessarily differ during reception of a SECAM signal, with one representing the output of the FM detector sampled during the appearance of lead-in oscillations of a frequency coinciding with the center frequency of its discriminator characteristic, and the other representing the output of the FM detector sampled during the appearance of lead-in oscillations of a frequency deviated from the center frequency of its discriminator characteristic. The difference between the outputs will have one sense when the phasing of flip-flop 35 is correct, and the opposite sense when the phasing of flip-flop 35 is incorrect.

Accordingly, the outputs of the respective sample-and-hold circuits 25,27 are supplied to a voltage comparator 29. A first output of the comparator 29 is applied to a level detector 33. The level detector 33 has an input threshold which is exceeded by said first output only when a significant difference exists between the inputs to the comparator 29, and the sense of said difference is that indicative of incorrect phasing. When the input threshold of level detector 33 is exceeded, it delivers an output that disables flip-flop 35. Upon such action occurring, the outputs of the sample-and-hold circuits will approach equality and the output of level detector 33 will return to a state enabling flip-flop 35. If the flip-flop phasing is now correct, no further disruption of flip-flop action occurs. If the flip-flop phasing is again incorrect, a new cycle of flip-flop disabling/enabling will ensue, with such cycles continuing until correct phasing is attained.

A second output of comparator 29 is applied to a second level detector 31. Level detector 31 has an input threshold which is exceeded by said second output only when a significant difference exists between the inputs to comparator 29, and the sense of said difference is that indicative of correct phasing. When the input threshold of level detector 31 is exceeded, it delivers an output that places switching apparatus 23 in its illustrated switching state establishing the SECAM mode of operation for the receiver. For all other conditions for the inputs to the comparator 29, the output of level detector 31 is such that switching apparatus 23 remains in its other switching state establishing the PAL mode of operation for the receiver.

With the sampling control pulses developed by pulse former 41 confining sampling intervals to the indicated $t_2$-$t_4$ segment of the backporch region of a horizontal blanking interval, one is assured, during PAL signal reception, that the previously discussed transients associated with the operation of FM detector 15 during the initial part of the PAL burst interval will not initiate a false switching to the SECAM mode of operation. Additionally, each $t_2$-$t_4$ sampling interval is of sufficient length to assure reliable performance in the identification system's control of the phasing of flip-flop 35 during SECAM signal reception.

What is claimed is:

1. In a dual-standard color television receiver having multiple operating modes and subject to alternative reception of (a) composite color television signals inclusive of a chrominance component encoded in a SECAM format and (b) composite color television signals inclusive of a chrominance component encoded in a PAL format; said SECAM-encoded chrominance component being accompanied by lead-in oscillations of a first subcarrier frequency during a terminal segment of the blanking portion of alternate active line intervals, and lead-in oscillations of a second subcarrier frequency during a similarly timed terminal segment of the blanking portion of the intervening active line intervals; said PAL-encoded chrominance component being accompanied by bursts of reference oscillations of a third subcarrier frequency, said bursts occupying a period of the blanking portion of each active line interval which corresponds in timing to an initial part of each of said terminal segments; apparatus comprising:

an FM detector responsive to the received signals;

means for generating line rate pulses having leading edges delayed relative to the beginning of said initial part of said terminal segments and trailing edges substantially coinciding with the termination of said terminal segments;

means, responsive to an output of said FM detector and to said line rate pulses, for developing a control signal indicative of the relationship between the amplitudes of (a) the output developed by said FM detector during alternate appearances of said line-rate pulses and (b) the output developed by said FM detector during the intervening appearances of said line rate pulses;

means, responsive to said control signal, for controlling the operating mode of said dual-standard color television receiver.

2. Apparatus in accordance with claim 1, wherein said FM detector is subject to operation in either a first state with center frequency tuning corresponding to said first subcarrier frequency, or a second state with center frequency tuning corresponding to said second subcarrier frequency;

wherein said apparatus also includes a triggered flip-flop circuit for providing, when enabled, a pair of half line rate wave outputs of mutually opposite phase; and means for controlling the operating state of said FM detector such that said FM detector operates in respectively different ones of said states during the image portions of successive active line intervals but operates in only said first state during the blanking portion of each active line interval; and wherein said control signal developing means includes first sampling means, coupled to receive an output of said FM detector, and responsive to said line rate pulses and to one of said pair of half line rate wave outputs, for sampling the output of said FM detector during a restricted portion of alternate ones of the terminal segments of the blanking portions of active line intervals, with initiation of said restricted portions substantially coinciding with said delayed leading edges and termination thereof substantially coinciding with said trailing edges; second sampling means, coupled to receive an output of said FM detector, and responsive to said line rate pulses and to the other of said pair of half line rate wave outputs, for sampling the output of said FM detector during a restricted portion of the intervening ones of the terminal segments of the blanking portions of active line intervals, with initiation of said restricted portions substantially coinciding with said delayed leading edges and termination thereof substantially coinciding with said trailing edges; and a voltage comparator responsive to the outputs of said first and second sampling means for producing said control signal.

3. Apparatus in accordance with claim 2 also including:

means, responsive to an output of said FM detector, for forming a quasi-PAL chrominance component;

a path for received signals bypassing said FM detector and said quasi-PAL chrominance component forming means; and a PAL chrominance component decoder; and wherein said receiver operating mode controlling means comprises switching means for supplying the output of said quasi-PAL chrominance component forming means to said decoder when in a first switching state and for supplying the output of said bypassing path to said decoder when in a second switching state; and wherein the control signal produced by said comparator causes said switching means to assume said first switching state only when the output level of a given one of said sampling means significantly exceeds the output level of the other of said sampling means.

4. Apparatus in accordance with claim 3 also including a source of sandcastle pulses inclusive of a horizontal blanking pulse component and a burst gating pulse component; a sandcastle pulse decoder responsive to said sandcastle pulses for separately deriving therefrom horizontal blanking pulses and burst gating pulses, said horizontal blanking pulses having trailing edges substantially coinciding with the termination of said terminal segments, and said burst gating pulses having leading edges occurring before said initial part of said terminal segments, and trailing edges occurring subsequent to said initial part of said terminal segments but prior to the termination of said terminal segments; and means for rendering said line rate pulse generating means responsive to said horizontal blanking pulses and said burst gating pulses derived by said sandcastle pulse decoder.

5. Apparatus in accordance with claim 4 wherein said quasi-PAL chrominance component forming means includes means responsive to said burst gating pulses derived by said sandcastle pulse decoder for forming bursts of reference oscillations to accompany said quasi-PAL chrominance component.

6. Apparatus in accordance with claim 5 wherein said line rate pulse generating means includes means for developing a train of pulses having leading edges substantially coinciding with the leading edges of said burst gating pulses derived by said sandcastle pulse decoder and trailing edges substantially coinciding with the trailing edges of said horizontal blanking pulses derived by sandcastle pulse decoder, delay means responsive to said train of pulses for slowing the rise time of the leading edges of said train of pulses, and a threshold device responsive to the output of said delay means for developing said line rate pulses having said delayed leading edges.

7. Apparatus in accordance with claim 3, wherein said FM detector operating state controlling means is responsive to one of said pair of half line rate wave outputs and to the horizontal blanking pulses derived by said sandcastle pulse decoder; said apparatus also including means, responsive to the outputs of said first and second sampling means, for disabling said flip-flop circuit when the output level of said other of said sampling means significantly exceeds the output level of said given one of said sampling means.

8. Apparatus in accordance with claim 1 wherein the delay of said delayed leading edges relative to the beginning of the initial part of said terminal segments is approximately one microsecond.

* * * * *

UNITED STATES PATENT AND TRADEMARK OFFICE
CERTIFICATE OF CORRECTION

PATENT NO. : 4,438,451

DATED : March 20, 1984

INVENTOR(S) : Werner Hinn, ET AL

It is certified that error appears in the above-identified patent and that said Letters Patent is hereby corrected as shown below:

Column 6, line 44 "FF" should be -- $\overline{FF}$ --

Column 8, line 36 "traling" should be -- trailing --

Signed and Sealed this

Ninth Day of October 1984

[SEAL]

Attest:

GERALD J. MOSSINGHOFF

*Attesting Officer*   *Commissioner of Patents and Trademarks*